United States Patent [19]

DeCoux

[11] Patent Number: 5,366,177
[45] Date of Patent: Nov. 22, 1994

[54] LAMINAR FLOW CONTROL APPARATUS FOR AERODYNAMIC SURFACES

[75] Inventor: Steven P. DeCoux, Long Beach, Calif.

[73] Assignee: Rockwell International Corporation, Seal Beach, Calif.

[21] Appl. No.: 956,323

[22] Filed: Oct. 5, 1992

[51] Int. Cl.$^5$ ............................................. B64C 21/08
[52] U.S. Cl. ................................. 244/201; 244/204; 244/209
[58] Field of Search ............... 244/201, 208, 209, 203, 244/207, 130, 204

[56] References Cited

U.S. PATENT DOCUMENTS

| | | | |
|---|---|---|---|
| 2,111,530 | 3/1938 | Seversky | 244/209 |
| 3,309,042 | 3/1967 | Edwards | 244/209 |
| 3,951,360 | 4/1976 | Anxionnaz | 244/209 |

*Primary Examiner*—Galen L. Barefoot
*Attorney, Agent, or Firm*—Terrell P. Lewis; Charles T. Silberberg

[57] ABSTRACT

Aerodynamic boundary layer control apparatus comprising a panel assembly having one surface for immersion in an ambient fluid flow and provided with perforations, a first array of fluid transporting channels fluidly coupled with various ones of the perforations, a second array of fluid transporting channels overlapping the first array of channels, and a suction-generating apparatus fluidly coupled with the second array of channels. An opposing surface of the panel assembly has a contour congruent with that of the aircraft wing or body structure to which it is to be removably attached. The suction-generating apparatus applies a suction force to the second array of channels to draw the ambient fluid into the first array of channels to enable conformace of the fluid with the one surface. Apertures couple the first and second fluid-transporting channels, and movable passage-blocking plates positioned in the apertures can be moved to enable creation of different magnitude suction forces at various predetermined locations at the exterior surface of the panel assembly.

16 Claims, 1 Drawing Sheet

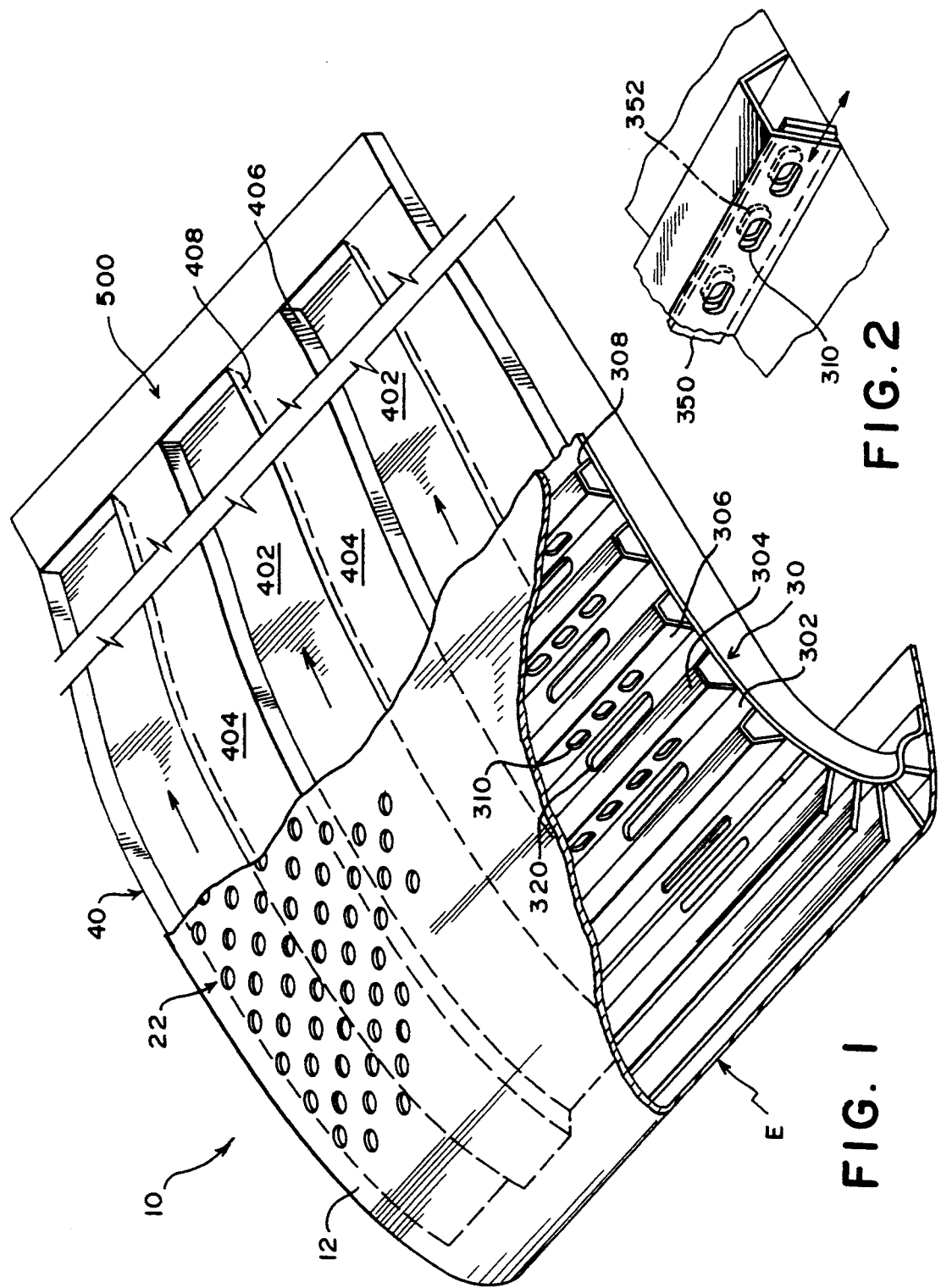

LAMINAR FLOW CONTROL APPARATUS FOR AERODYNAMIC SURFACES

BACKGROUND OF THE INVENTION

1. Field of the Invention

The present invention relates to laminar flow control apparatus for aerodynamic surfaces, and more particularly to an apparatus adapted to be mounted on an aircraft structural surface, such as a wing or fuselage, to interact with fluid flowing over the structural surface in such a manner as to stabilize turbulent fluid flow at the surface and thereby produce very efficient flow of the fluid over the aircraft surface.

2. Background of the Invention

The technique of controlling a mainstream of ambient fluid moving across aerodynamic surfaces has been known for some time. This technique is known as laminar flow control (LFC), and is important for eliminating undesired drag and turbulence in the immediate vicinity of aerodynamic working surfaces. Generally, a secondary fluid stream under pressure is caused to pass through pores in an aerodynamic working surface. The pressure field created by the secondary fluid impinges on a mainstream of ambient fluid flowing over the surface, and has the effect of altering behavior of the mainstream fluid flow, most desirably of causing the mainstream of fluid to be entrained closely along the working surface.

Significant advantages accrue from using laminar flow control techniques In aerodynamic vehicles, including significant reductions in total overall gross weight, fuel burned and engine size. Laminar flow control in these vehicles can be useful at supersonic, as well as subsonic, speeds.

In supersonic aircraft or in spacecraft, it would be highly desirable to achieve 50% to 60% chord laminar flow on a highly swept wing with an advanced pressure distribution across the wing at supersonic speeds.

A typical aircraft laminar flow control wing panel comprises a multi-layer, reinforced structure including inner and outer skins and one or more internal reinforcing members bonded at selected regions to the inner and outer skins. The panel skins are on the order of 0.025"–0.040" thick, are hot-formed to assure excellent aerodynamic surface quality, and are laser drilled with hole-spacing tailored for optimum suction distribution.

Factors which influence design of laminar flow control wing panels include the pressure distribution over the region to be laminarized, skin perforation patterns, size and spacings, and internal flow requirments. Control of this last factor influences the suction distribution required over the suction surface for a range of design and off-design conditions, as well as the outflow from the suction surface and pressure loss through the internal flow passages.

OBJECTS AND SUMMARY OF THE INVENTION

A principal object of the present invention is to provide a novel method and apparatus for the stabilizing fluid flow over a surface of an aerodynamically contoured laminar flow control panel, while simultaneously overcoming the deficiencies and drawbacks of currently known apparatus of like kind.

Another object of the present invention is to provide a novel aerodynamically-configured laminar flow control panel for subsonic and supersonic aircraft structures which will assist in eliminating turbulent fluid flow over an exterior surface of an aircraft structure surface.

Still another object of the invention is to provide a removable "glove" assembly for a structural member of an aerospace vehicle which is contoured to be removably attached in a predetermined manner to the structural member so as to be fluidly coupled with a suction generating mechanism, whereby a flow of ambient fluid, passing over the vehicle's exterior surface, is entrained closely along the exterior surface of the glove assembly.

These and other objects are achieved by providing a glove assembly for detachable mounting on a surface, such as a wing or the fuselage, of an aerodynamic vehicle. The glove assembly includes an upper face member having a perforated surface, and arrays of fluidly interconnected channels beneath the upper face member. A suction-generating mechanism is fluidly coupled with the channels for inducing the "layer" of ambient fluid proximal to and flowing over the surface of the upper face member to be drawn through the perforations and into the channels thereby stabilizing flow of the ambient fluid over said upper surface of the glove assembly.

The arrays of channels comprise a first array of fluid conveying channels fluidly coupled with at least some of the perforations and a second array of fluid conveying channels fluidly coupled with at least some of the channels in the first array. Movable fluid-blocking gates carried by the channels can alter the suction effect of the suction-generating mechanism.

Preferably, the glove assembly has one exterior aerodynamically configured surface adapted for fluid contact with ambient fluid and an opposing surface exhibiting a contour which corresponds to that of the aircraft structure to which it is to be removably attached. When the suction-generating apparatus is operational, suction is applied directly to the second array of channels and indirectly to the first array of channels and through the perforations to induce ambient fluid to flow over the aerodynamic surface in close proximity to that surface. Apertures interconnect the fluid-conveying channels of the respective channel arrays, and the movable fluid-blocking plates positioned in the apertures enable different magnitude suction forces to be developed at various predetermined locations at the exterior surface of the panel assembly.

BRIEF DESCRIPTION OF THE DRAWINGS

FIG. 1 is a perspective view of a glove assembly and suction mechanism In accordance with the present invention, which has been configured for attachment to an aircraft wing;

FIG. 2 is a cross-sectional view of a channel member with apertures and an aperture size-altering mechanism.

DETAILED DESCRIPTION OF THE INVENTION

Referring first to FIG. 1, the principal components of the laminar flow control aerodynamic panel assembly 10 contemplated by the present invention are shown to include an aerodynamically configured panel member 12 having a predetermined pattern of perforations extending through its thickness and its upper surface immersed in an ambient fluid flow, a first array of channel-defining members 14 extending in a first pattern, a second array of channel-defining members 16 arranged in a second pattern, and suction-generating apparatus 18 to which the channel-defining members 16 are appropriately fluidly coupled. Although the laminar flow control panel assembly of the invention can be used with any aerodynamic structure, in the Figure the panel is shown secured on an aircraft wing structure.

The array of perforations 22 in panel 12 facilitate communication of the fluid volume beneath the upper surface of panel 12 with the ambient fluid flow. The perforations may be arranged in random patterns or in prearranged patterns, and it is understood that the entire surface of panel 12 could be provided with perforations or any portion or portions of the surface which is less than the whole.

The present invention contemplates defining discrete pressure zones at the surface to entrain movement of ambient fluid along the surface by pulling an "adjacent" layer of fluid through the perforations and into the fluid volume beneath the panel surface. These pressure zones will alter the flow of fluid passing over the upper surface. Of course, all of the zones at the surface may have the same pressure; however, It is further contemplated, within the scope of teachings of this invention, that the zones at the surface can be distinct, and can be controlled by variation of the amount of fluid flowing through the environment beneath the surface (the manner for effecting this will be discussed in more detail below).

Disposed immediately below panel 12 are a first array 30 of channel-defining members, and a second array 40 of channel-defining members.

In the preferred embodiment of the invention shown in FIG. 1, all of the channel-defining members in each respective first and the second arrays have substantially the same cross-sectional configuration or shape. The present invention contemplates, however, that the channel-defining members in one or both array(s) may be fabricated from a structure of similar continuous elements defining channels of the same or congruous cross-section, such as corrugated sheets or truss core sandwich structures, or from a plurality of appropriately spaced individual elements, such as partitions walls. It is also contemplated that channel-defining members of non-uniform cross-sectional configuration may be used where considered appropriate.

Inasmuch as a variety of structural members could be used to delimit the requisite channels in each array, the term "channel-defining members" has been used throughout this disclosure. Nevertheless, the invention embraces singular structural elements aligned one with another within the novel glove assembly described herein which could more precisely be referred to as "channel members".

Each of the channel-defining members in the first array 30 extends in a direction substantially parallel with the leading edge E of the aircraft wing to which it will be removably attached. Each channel-defining member in the first array includes a base portion 302, an upper portion 304, and side wall portions 306,308 interconnecting the upper portion with the base portion.

Each of the channel-defining members in the second array 40 extends in a direction substantially perpendicular to the leading edge of the wing, and comprises a base portion 402, an upper portion 404, and side wall portions 406, 408.

The second array 40 of channel-defining members may be secured or joined, as by bonding or welding, to the first array 30 of channel-defining members, as for example by attachment of each upper portion 404 of the second array to the base portions 302 of the first array of channel-defining members.

The side wall portions of the channel-defining members in the first array 30 includes holes or openings 310 through which fluid can pass. The location and size of the apertures are determined according to mathematical and computer models and as a function of known or desired pressure distributions and gradients on the surface of panel 12 and desired pressure distributions and gradients in each of the pressure zones $P_i$, where i = 1, 2, 3,.

Apertures 320 are also provided in the base portions 302 of the first array of channel-defining members. The location and size of these apertures are predetermined in the same manner and based on the same criteria as for the apertures provided in the side wall members of the first array. The openings in the side wall portions of the first array communicate the fluid environment located at the working surface of the panel 10 with the successively channel-configured fluid environments defined within the first array 30 of channel-defining members.

The suction generating apparatus (shown generally as 500 in FIG. 1) is fluidly interconnected with the second array 40 of channel-defining members. Examples of the suction-generating apparatus which are contemplated by the present invention include a pump, a turbo-compressor (powered for example by engine bleed air), or an electrically or hydraulically driven vacuum system.

By appropriately choosing the size and location of the openings discussed above, predetermined suction distribution at the working surface can be achieved, thereby facilitating entrainment of the fluid passing over the surface.

The effective length of the second array of channels can be changed by appropriately locating the fluid coupling apertures between the first and second arrays start relative to the leading edge, or by inserting a barrier or dam into the trough of the channel-defining member of the second array.

Referring to FIG. 2, there is generally shown structure capable of altering the size of the apertures 310 in each of the channel members of the first array. As shown in this example, a plate 350 is slidably supported on a side wall member 306 (or 308 in the case where either side wall member is used where both side wall members are used) in which the apertures 310 have been formed. Plate 350 is provided with openings 352 which preferably correspond In location and size with the apertures 310. The plate is slidably movable along the axis of the channel member so that the openings 352 can be displaced at various locations between one position in which each of the openings substantially overlap a corresponding one of the apertures 310 to a second position in which each of the openings is substantially removed from a corresponding one of the apertures 310. Thus, the "effective" size of the apertures 310 can be varied between being substantially entirely open to substantially entirely closed.

Movement of the plate 350 relative to the side wall member 306,308 of the channel member can be effected through various mechanisms. For example, the plate 350 could be controlled using a remote actuator, such as radio or microwave actuators. The plate could alternatively be controlled using an ambient condition actuator, i.e., one which reacts in response to an ambient condition such as temperature, air flow speed, turbulence, etc. Mechanisms for effecting movement of the plate can be electrical, pneumatic, mechanical or hydraulic.

Thus it is apparent that there has been provided, in accordance with the present invention, an apparatus and method for controlling pressure at the surface of a perforated panel which fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations which fall within the spirit and scope of the appended claims.

What is claimed is:

1. A system in an aerodynamic structure for controlling flow of ambient fluid over a surface of said structure, said surface including laminar flow control perforations extending over substantially the entire surface of said structure, said system comprising:

a first array of channel-defining members in said aerodynamic structure for fluidly communicating one interior volume with at least a subset of said perforations, all of said first array channel-defining members being disposed in a first pattern, a second array of channel-defining members in said aerodynamic structure for fluidly communicating another interior volume with the fluid in the first array, all of said second array channel-defining members being disposed in a second pattern crossing said channel-defining members of said first array, and means for applying a suction force to said second array of channel members, means for controlling fluid flow in said second array to provide discrete zones of pressure at said surface such that said suction force acts, via said arrays, to entrain ambient fluid along said aerodynamic structure surface.

2. The system of claim 1, wherein said one interior volume and said another interior volume are fluidly interconnected.

3. The system of claim 1, wherein said aerodynamic structure is an aircraft wing, and said first array of channel-defining members are arranged parallel to one another and parallel to the leading edge of the wing.

4. The system of claim 3, wherein said second array of channel-defining members is arranged substantially normal to the leading edge of the wing.

5. The system of claim 3, wherein said aerodynamic structure is an aircraft wing, and said second array of channel-defining members is arranged substantially normal to said channel-defining members in said first array.

6. The system of claim 1, wherein said aerodynamic structure is an aircraft fuselage section.

7. The system of claim 1, wherein said means for fluidly communicating said first array with perforations in the surface comprises apertures having an opening of at least one size.

8. The system of claim 7, wherein said means for fluidly communicating said first array with perforations in the surface further comprises means for changing the size of said apertures.

9. The system of claim 8, wherein said means for changing the size of said apertures comprises plate means slidably supported on a side of a channel member.

10. The system of claim 8, wherein said means for changing the size of said apertures includes remotely controlled actuators.

11. The system of claim 8, wherein said means for changing the size of said apertures includes actuators responsive to conditions associated with at least one of said laminar flow control surface, said first array of channels, said second array of channels or said source of pressure.

12. The system of claim 8, wherein said means for changing the size of said apertures includes temperature-responsive actuators.

13. A method for controlling flow of fluid along a perforated panel of the type mounted on aerodynamic surfaces and typically used for laminar fluid flow control, said method comprising:

providing perforations in said panel extending over substantially the entire surface thereof, arranging a first array of channel members beneath said perforated panel, and providing means in said first array of channel members for fluiding communicating perforations in said panel with said first array of channel members, arranging a second array of channel members beneath said first array of channel members, and providing means in said first array of channel members for fluidly communicating said second array of channel members with said first array of channel members, applying pressure to one end region of said second array of channel members, and providing means for controlling fluid flow in said second array to provide discrete zones of pressure at said surface, such that the flow of fluid between said first and second arrays, and consequently between said first array and said perforations in said panel, can be controlled in a predetermined manner.

14. The method of claim 13, wherein said step of providing means in said first array of channel members for fluidly communicating said second array of channel members with said first array of channel members comprises providing variable sized openings in said first array of channel members and means for selectively varying the size of said openings in response to predetermined inputs, whereby upon altering the size of said openings, variation of fluid flow through said panel perforations can be effected thereby achieving control of fluid over the panel surface.

15. The method of claim 13, and further including the step of actuating said communicating means In said first array of channel members In response to an ambient condition.

16. The method of claim 13, and further including the step of actuating said communicating means In said first array of channel members in response to an externally supplied actuating signal.

* * * * *